United States Patent
Kim (10) Patent No.: US 10,986,269 B2
(45) Date of Patent: Apr. 20, 2021

(54) APPARATUS FOR PROVIDING EXTERNAL PANORAMIC VIEW CONTENTS FOR AIRCRAFT DURING FLIGHT

(71) Applicant: Keun Hyung Kim, Seoul (KR)

(72) Inventor: Keun Hyung Kim, Seoul (KR)

( * ) Notice: Subject to any disclaimer, the term of this patent is extended or adjusted under 35 U.S.C. 154(b) by 0 days.

(21) Appl. No.: 16/555,967

(22) Filed: Aug. 29, 2019

(65) Prior Publication Data

US 2021/0006712 A1    Jan. 7, 2021

(30) Foreign Application Priority Data

Jun. 3, 2019    (KR) .................. 10-2019-0065175

(51) Int. Cl.
| | |
|---|---|
| *H04N 5/232* | (2006.01) |
| *H04N 5/247* | (2006.01) |
| *G06F 3/14* | (2006.01) |
| *B64D 11/00* | (2006.01) |
| *B64D 47/08* | (2006.01) |
| *H04N 5/262* | (2006.01) |
| *H04N 21/422* | (2011.01) |

(52) U.S. Cl.
CPC ..... *H04N 5/23238* (2013.01); *B64D 11/0015* (2013.01); *B64D 47/08* (2013.01); *G06F 3/1446* (2013.01); *H04N 5/247* (2013.01); *H04N 5/2624* (2013.01); *H04N 21/42204* (2013.01)

(58) Field of Classification Search
CPC .. H04N 5/23238; H04N 5/247; H04N 5/2624; H04N 5/4403; B64D 11/0015; B64D 47/08; G06F 3/1446

USPC .......................................................... 348/38
See application file for complete search history.

(56) References Cited

U.S. PATENT DOCUMENTS

| | | | | |
|---|---|---|---|---|
| 2016/0325836 | A1* | 11/2016 | Teo ........................ | H04N 7/183 |
| 2017/0094167 | A1* | 3/2017 | Riedel .................. | H04N 13/349 |
| 2017/0289463 | A1* | 10/2017 | Asao ...................... | H04N 7/183 |

(Continued)

FOREIGN PATENT DOCUMENTS

| | | |
|---|---|---|
| JP | 2007527161 A | 9/2007 |
| JP | 2009526691 A | 7/2009 |
| JP | 2011507755 A | 3/2010 |

(Continued)

OTHER PUBLICATIONS

Korea Office Action, dated May 20, 2020 for corresponding Korean application No. 10-2019-0065175 with English translation (13 pages).

(Continued)

*Primary Examiner* — Ayman A Abaza
(74) *Attorney, Agent, or Firm* — Intellectual Property Law Group LLP (57) ABSTRACT

Provided is an apparatus for providing external panoramic view contents for an aircraft during flight by installing a plurality of cameras in a plurality of windows installed in an aircraft for displaying external panoramic views inside the aircraft while the aircraft flies in order for aircraft passengers to enjoy them. The apparatus includes a shooting unit having a plurality of cameras for shooting aircraft's external panoramic views; a control unit for receiving a plurality of images from the cameras and processing them; and a display unit comprising a single display and a multi-display including a plurality of sub-displays.

4 Claims, 8 Drawing Sheets

(56) References Cited

U.S. PATENT DOCUMENTS

2018/0237157 A1\* 8/2018 Jin ........................... G06T 3/00

FOREIGN PATENT DOCUMENTS

| KR | 10-0599540 B1 | 7/2006 |
|----|---------------|--------|
| KR | 10-2014-0024444 A | 2/2014 |
| KR | 20190026507 A | 3/2019 |

OTHER PUBLICATIONS

Decision to Grant, dated Sep. 21, 2020 for for corresponding Korean application No. 10-2019-0065175 with English translation (3 pages).

\* cited by examiner

APPARATUS FOR PROVIDING EXTERNAL PANORAMIC VIEW CONTENTS FOR AIRCRAFT DURING FLIGHT

CROSS-REFERENCE TO RELATED APPLICATIONS

This application claims priority to Korean Patent Application No. 10-2019-0065175, filed on Jun. 3, 2019 in the Korean Intellectual Property Office, the entire disclosure of which is incorporated herein by reference.

BACKGROUND

1. Field

The present disclosure relates to an apparatus for providing external panoramic view contents for aircraft during flight, more particularly an apparatus for providing external panoramic view contents for aircraft during flight by installing a plurality of cameras in a plurality of windows installed in an aircraft for displaying external panoramic views inside the aircraft while the aircraft flies in order for aircraft passengers to enjoy them.

2. Description of the Related Art

Every airline currently makes, according to safety procedures, the window shades of their aircraft cabins open until the aircrafts reaches their cruising altitude when taking off and below 10,000 ft when landing. Otherwise, passengers sitting adjacent to cabin windows can open or close the shades. Such passengers sitting adjacent to cabin windows can see the external panoramic views during flight at their discretion but with limited sight while others having a seat on the side of the aisle in the middle have difficulty in watching such external views during the flight.

Korean Patent Registration No. 10-0599540, "METHOD AND SYSTEM FOR PASSENGER-PERSONALIZED MEDIASERVICE THROUGH SENSOR NETWORKING IN AIRPLANE" discloses a customized multimedia service system and equipment thereof for selectively displaying multimedia contents for aircraft passengers, providing a multimedia service system and its operating method, including: a content producing server which acquires multimedia contents based on the passenger information provided at the time of boarding reservation and produces contents for passengers for each aircraft by classifying, storing and editing them; an in-flight multimedia storing device which stores multimedia contents; a central server which stores, before takeoff, relevant contents in the in-flight multimedia storing device among the multimedia contents produced in the content producing server and broadcasts, during flight, the multimedia contents received from the multimedia storing device on wired and wireless networks; a service processor for each seat which receives and stores unique information from passengers and selectively receives the multimedia contents from the central server based on the unique information; and a display device which receives the selected multimedia contents from the service processor for each seat and displays them.

Korean Patent Publication No. 10-2014-0024444, "MULTIMEDIA CONTENT TAILORED CABIN, IN-FLIGHT SERVICE PROVIDING METHOD" provides a method for providing tailored in-flight multimedia contents, including: for the case before boarding, a step for suggesting in-flight multimedia content service items to customers (in-flight multimedia service suggesting step); a step for one or more among the suggested in-flight multimedia content service items to be selected by the customers (in-flight multimedia service selecting step); and, for the case after boarding, a step providing the customers with the in-flight multimedia content service items as selected by the customers through an in-flight multimedia displaying device (in-flight multimedia service providing step).

However, in-flight services for aircraft passengers to enjoy external panoramic views inside their aircraft while it flies are not being provided.

RELATED ART DOCUMENTS

Patent Literature (Patent Literature 1) Korean Patent Registration No. 10-0599540, "METHOD AND SYSTEM FOR PASSENGER-PERSONALIZED MEDIASERVICE THROUGH SENSOR NETWORKING IN AIRPLANE" (Registered on Jul. 5, 2006).

(Patent Literature 2) Korean Patent Publication No. 10-2014-0024444, "MULTIMEDIA CONTENT TAILORED CABIN, IN-FLIGHT SERVICE PROVIDING METHOD" (Publicized on Feb. 28, 2014).

SUMMARY

The present disclosure provides an apparatus for providing external panoramic view contents for an aircraft during flight by installing a plurality of cameras in a plurality of windows installed in an aircraft for displaying external panoramic views inside the aircraft while the aircraft flies in order for aircraft passengers to enjoy them.

The present disclosure provides external views in the form of a panorama for an aircraft during flight by installing a flexible display on curved surfaces such as offcuts in the cabin space, not limited to flat spaces therein such as the back of passenger seats.

The present disclosure provides a service for aircraft passengers to enjoy external panoramic views during flight at various angles and at various positions by enabling them to select any one of by-direction view and by-camera view of the external panoramic view contents during flight.

The present disclosure provides the apparatus for providing external panoramic view contents for an aircraft passengers during flight without modifying existing aircraft structures.

In addition, the present disclosure provides the apparatus for providing external panoramic view contents for aircraft passengers during flight by integrating it with existing in-flight entertainment systems.

The apparatus for providing external panoramic view contents for aircraft during flight includes: a shooting unit 110; a display unit 130; and a control unit 120, wherein the shooting unit 110 includes a plurality of cameras 112, 114, 116 each of which is installed in each of a plurality of windows installed in an aircraft for shooting its external panoramic views; the display unit 130 includes a single display 132 and a multi-display 134 which includes a plurality of sub-displays, wherein the multi-display 134, composed of flexible displays, is installed in the space between the windows and the ceiling inside an aircraft cabin; and the control unit 120, being connected to the shooting unit 110 and the display unit 130, controls the shooting unit 110 and the display unit 130 and receives a plurality of images taken by the cameras 112, 114, 116, thereby, through the multi-display 134 installed in the space between the windows and the ceiling inside the aircraft cabin, providing the images being taken by the cameras installed in a plurality of the windows adjacent to the corresponding space in the form of a panoramic view.

In addition, a plurality of the cameras 112, 114, 116 are installed on a predetermined middle layer among a plurality of layers of aircraft windows and connected to the control unit 120 by means of optical fiber cables.

In addition, the cameras 112, 114, 116 are installed at angles different from each other when being installed in aircraft windows so that shooting angles of the taken images vary.

In addition, at least one of the cameras 112, 114, 116 is installed in the front windows of the aircraft cockpit.

In addition, the control unit 120 controls camera identification information for identifying each of the cameras 112, 114, 116 and performs a process for composing a plurality of images based on installation location information so as to provide the images acquired by the cameras in the form of panoramic views, wherein the installation location information includes installation location information and installation angle information according to which the cameras 112, 114, 116 are installed in the aircraft windows.

In addition, the control unit 120 performs control so that it classifies and manages the images taken by the cameras 112, 114, 116 using the camera identification information which identifies each of the cameras 112, 114, 116, transfers to the display unit 130 at least one of the images taken by the cameras 112, 114, 116 according to a first image output request signal from the single display 132 and a second image output request signal from the multi-display 134 as received from the display unit 130 and produces, when the second image output request signal is received, panoramic views by using the images taken by the cameras 112, 114, 116, thereby outputting the produced panoramic view images to the multi-display 134 based on array composition information of the multi-display 134.

In addition, the array composition information of the multi-display 134 includes the number and array shape information of a plurality of the sub-displays as included in the multi-display 134 while the control unit 120 processes the images taken according to the array composition information of the multi-display 134, thereby distributing them a plurality of the sub-displays included in the multi-display 134.

In addition, the control unit 120 provides a view selection menu when outputting images to the single display 132 and the multi-display 134, wherein the view selection menu includes a by-direction view selection mode for selecting by-direction views depending on the direction in which the cameras are installed in the aircraft and a by-camera view selection mode for selecting by-camera views.

In addition, the by-direction views depending on the direction in which the cameras are installed include an aircraft front-left camera view, an aircraft front-right camera view, an aircraft rear-left camera view and an aircraft rear-right camera view.

In addition, the control unit 120 manages display identification information and display characteristic information of the single display 132 and the multi-display 134 included in the display unit 130, wherein the display characteristic information includes display type information to identify whether one corresponds to the single display or the multi-display, display installation location information and, when it comes to the multi-display, multi-display array information, wherein the display installation location information includes display installation angle information and adjacent display identification information.

In addition, the display unit 130 further includes a communication module which recognizes a plurality of display sensors which are installed in a plurality of the displays for detecting the installation form of each of the displays and the adjacent displays and communicates with the control unit 120 while the control unit 120 collects the display installation location information by means of communication with the communication module of the display unit 130.

The present disclosure provides an advantageous effect of displaying external panoramic views inside an aircraft during its flight in order for aircraft passengers to enjoy them by installing a plurality of the cameras in the windows installed in the aircraft.

The present disclosure provides another advantageous effect of providing external views in the form of a panorama for an aircraft during flight by installing a flexible display on curved surfaces such as offcuts in the cabin space, not limited to flat spaces therein such as the back of passenger seats.

The present disclosure provides another advantageous effect for passengers to enjoy external panoramic views during aircraft flight at various angles and in various positions by enabling them to select any one of the by-direction view and the by-camera view of the external panoramic view contents during flight.

The present disclosure provides another advantageous effect of providing external panoramic view contents during flight for aircraft passengers without modifying existing aircraft structures.

In addition, the present disclosure provides another advantageous effect of providing external panoramic view contents during flight for aircraft passengers by integrating it with existing in-flight entertainment systems.

DETAILED DESCRIPTION OF SPECIFIC EMBODIMENTS

Since the present disclosure may have various modifications and embodiments, the present disclosure is now described below in detail in connection with specific embodiments and accompanying drawings.

Figure 1:
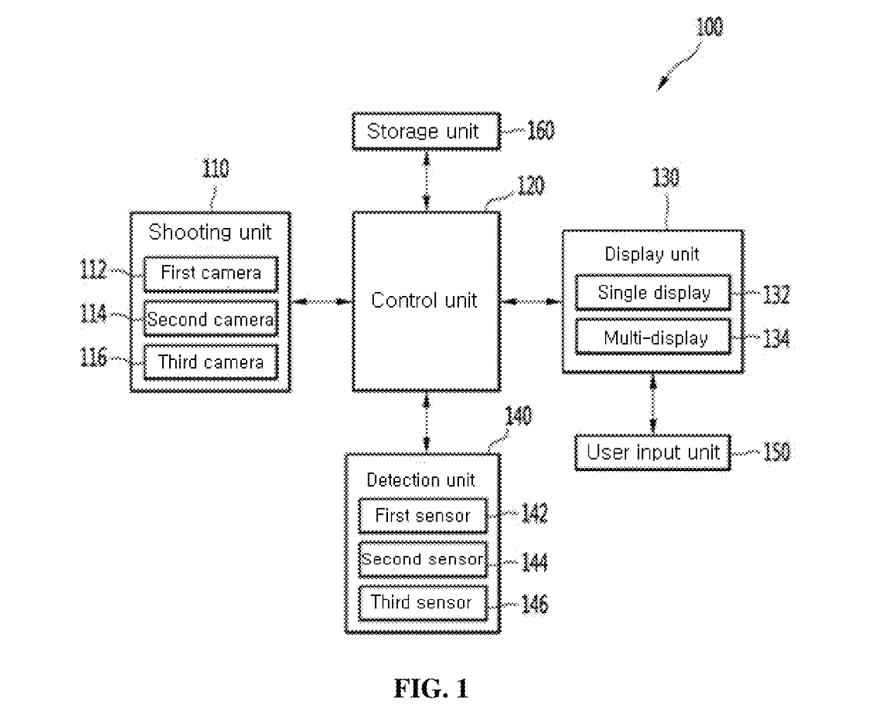
FIG. 1 is a block diagram which describes a configuration of the apparatus for providing external panoramic view contents for an aircraft during flight according to an embodiment of the present disclosure.

FIG. 1 is a block diagram which describes a configuration of the apparatus for providing external panoramic view contents for an aircraft during flight according to an embodiment of the present disclosure. The apparatus for providing external panoramic view contents for an aircraft during flight 100 according to the present disclosure includes the shooting unit 110, the control unit 120 and the display unit 130. The apparatus for providing external panoramic view contents for an aircraft during flight 100 can further include a detection unit 140, a user input unit 150 and a storage unit 160 depending on embodiments.

Furthermore, the shooting unit 110, the control unit 120, the display unit 130, the detection unit 140, the user input unit 150 and the storage unit 160 can be connected on a wired network. Otherwise, part or the whole of their connection can be done on a wireless network. Here, the shooting unit 110, the control unit 120 and the display unit 130 can be operated by using the internal electric power source of an aircraft.

The shooting unit 110 includes a plurality of the cameras 112, 114, 116 which are installed by being inserted in a plurality of windows installed in an aircraft to shoot aircraft external panoramic views. Since an aircraft typically has double pane window panels installed, a plurality of the cameras 112, 114, 116 can be installed in a middle one among a plurality of layers, e.g. middle layer of double pane window thereby leaving no modification in existing aircraft structures. Although FIG. 1 illustrates for convenience that the shooting unit 110 includes a first camera 112, a second camera 114 and a third camera 116, the number of the cameras that can be included in the shooting unit 110 is not limited thereto.

Since an aircraft typically assumes a streamlined form, when a plurality of the cameras 112, 114, 116 are installed in a plurality of the windows, they can have installation angles different from each other even if they are placed perpendicularly to the window panels and shooting angles of the images taken can vary depending on their installation angles. In addition, the shooting angles of the images can vary when the cameras 112, 114, 116 are installed in the windows at angles different from each other.

The windows installed in an aircraft include a plurality of the windows installed on the both flanks of the aircraft, through which the outside can be seen from passenger seats, and the front windows installed in front of the cockpit, through which the captain can see the outside. Therefore, at least one of the cameras 112, 114, 116 can be installed in the cockpit front windows. Although each of the cameras 112, 114, 116 can be connected to the control unit 120 by means of optical fiber cables, they can be connected over various types of wired and wireless communication networks, not limited thereto.

Being connected to the shooting unit 110 and the display unit 130, the control unit 120 controls the shooting unit 110 and the display unit 130. The control unit 120 can control the detection unit 140, the user input unit 150 and the storage unit 160 that can be further included in the apparatus for providing external panoramic view contents for an aircraft during flight 100.

The control unit 120 receives from the cameras 112, 114, 116 images taken by them, processing the images. By managing camera identification information which identifies each of the cameras 112, 114, 116, the control unit 120 can classify and manage the images taken by the cameras 112, 114, 116 by using the camera identification information which identifies each of the cameras 112, 114, 116. When the images are received from each of the cameras 112, 114, 116, the control unit 120 can add shooting time information of each of the images to image frames, thereby managing the images taken together with the shooting time information.

The control unit 120 can manage the camera identification information of the cameras 112, 114, 116 together with their installation location information. The installation location information can include installation location information and installation angle information according to which the cameras 112, 114, 116 are installed in the aircraft windows. The control unit 120 can perform a process for composing a plurality of the images based on the installation location information so as to provide the images acquired by the cameras in the form of panoramic views. For this purpose, the control unit 120 can coordinate installation locations of the windows inside an aircraft, thereby managing them as aircraft window installation location information.

The display unit 130 can include the single display 132 and the multi-display 134 which includes a plurality of the sub-displays. Although FIG. 1 illustrates for convenience only one of the single display 132 and only one of the multi-display 134, the installation number and installation location of the single display 132 and the multi-display are not restricted as long as they can be installed inside an aircraft.

The single display 132 can have a flat panel display or a flexible display while the multi-display 134 has a flexible display, wherein such a flexible display can include an adhesive layer for adhesion to aircraft walls, seatbacks and the like. The flexible display can display images of identical quality even when folded or bent and be materialized in the form of flexible LCD panels, flexible OLEDs or electronic paper.

When the single display 132 and the multi-display 134 have flexible displays, it is possible to reduce the weight of aircrafts compared with flat panel displays, also reduce aircraft electric power consumption due to their low power consumption and place the display unit 130 at diverse positions and in diverse shapes depending on cabin shapes because they can be installed even on curved surface.

The control unit 120 performs control so that it transfers to the display unit 130 at least one of the images taken by the cameras 112, 114, 116 according to the first image output request signal from the single display 132 and the second image output request signal from the multi-display 134 as received from the display unit 130 and produces, when the second image output request signal is received, panoramic views by using the images taken by the cameras 112, 114, 116, thereby outputting the produced panoramic view images to the multi-display 134 based on array composition information of the multi-display 134.

The multi-display 134 is installed in the space between the windows and the ceiling inside an aircraft cabin (for example, the vertical gap between the window and the ceiling inside Airbus 320 cabins measures 45 cm) while the control unit 120 can provide the images being taken by the cameras 112, 114, 116 installed in a plurality of the windows adjacent to the corresponding space in the form of a panoramic view through the multi-display 134 installed in the space between the windows and the ceiling inside the aircraft cabin.

The array composition information of the multi-display 134 can include the number and array shape information of a plurality of the sub-displays as included in the multi-display 134. The control unit 120 can process the images taken according to the array composition information of the multi-display 134, thereby distributing them a plurality of the sub-displays included in the multi-display 134.

The control unit 120 can provide the view selection menu when outputting images to the single display 132 and the multi-display 134, wherein the view selection menu can include the by-direction view selection mode for selecting by-direction views depending on the direction in which the cameras are installed in the aircraft and the by-camera view selection mode for selecting by-camera views.

The control unit 120 can collect through the view selection menu the identification information of a display outputting the images taken by the cameras then determine the display which is outputting the images taken by the cameras among a plurality of the displays included in the display unit 130 by using the collected display identification information through the view selection menu.

The control unit 120 manages display identification information and display characteristic information of the single display 132 and the multi-display 134 included in the display unit 130, wherein the display characteristic information can include display type information to identify whether one corresponds to the single display or the multi-display, display installation location information and, when it comes to the multi-display, multi-display array information. The display installation location information can include display installation angle information and adjacent display identification information.

The display unit 130 can further include the communication module (not illustrated) which recognizes a plurality of the display sensors which are installed in a plurality of the displays for detecting the installation form of each of the displays and the adjacent displays and communicates with the control unit 120. Here, the control unit 120 can collect the display installation location information by means of communication with the communication module (not illustrated) of the display unit 130.

Each of the displays included in the display unit 130 can be configured so that it includes the communication module (not illustrated), transmits and receives with the adjacent display the display identification information of their own through the communication module, communicates by using the transmitted and received identification information of each of the displays and transmits and receives their display installation location information. Therefore, each of the displays included in the display unit 130 can collect the identification information and installation location information of adjacent one among the displays and transfer the collected identification information and installation location information of the one among the displays to another one among the displays or the control unit 120.

The apparatus for providing external panoramic view contents for an aircraft during flight 100 can further include the detection unit 140 which includes a plurality of sensors 142, 144, 146 for detecting the external environment of an aircraft. Information the sensors 142, 144, 146 detect can include velocity information, temperature information, flight angle information and altitude information.

The user input unit 150 can include various types of user input devices such as remote controllers, buttons and keypads that can enable a user to input to the single display 132 and the multi-display 134 of the display unit 130. The user input unit 150 can be integrated into each of the single display 132 and the multi-display 134 to form a type of touchpads. User input signals of the user input unit 150 are transferred to the control unit 120 and the control unit 120 can provide application operation, image views and the like according to the user input signals.

The storage unit 160 can store and manage a plurality of applications and data so as to process the various data processed by the control unit 120. The storage unit 160 can store and manage the images taken by the shooting unit 110 together with the identification information and shooting time information of each of the cameras according to the control of the control unit 120.

Figure 2:
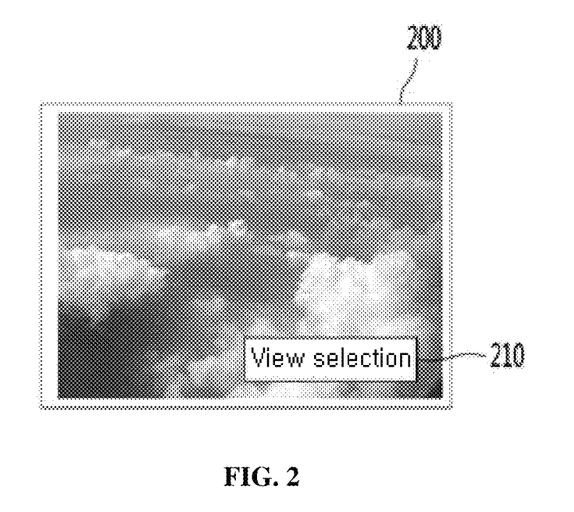
FIG. 2 is a drawing which shows a screen in which an aircraft external panoramic view image is provided on the single display of FIG. 1 according to an embodiment of the present disclosure.

FIG. 2 is a drawing which shows a screen in which an aircraft external panoramic view image is provided on the single display of FIG. 1 according to an embodiment of the present disclosure. Aircraft external panoramic view images can be provided by means of the single display 200 as in FIG. 2 as an example of the single display of FIG. 1. The single display 200 can be either a flat panel display or a flexible display and installed on the back of aircraft passenger seats. A view selection menu icon 210 for providing the view selection menu can be provided together when the single display 200 provides the aircraft external panoramic view images.

Figure 3:
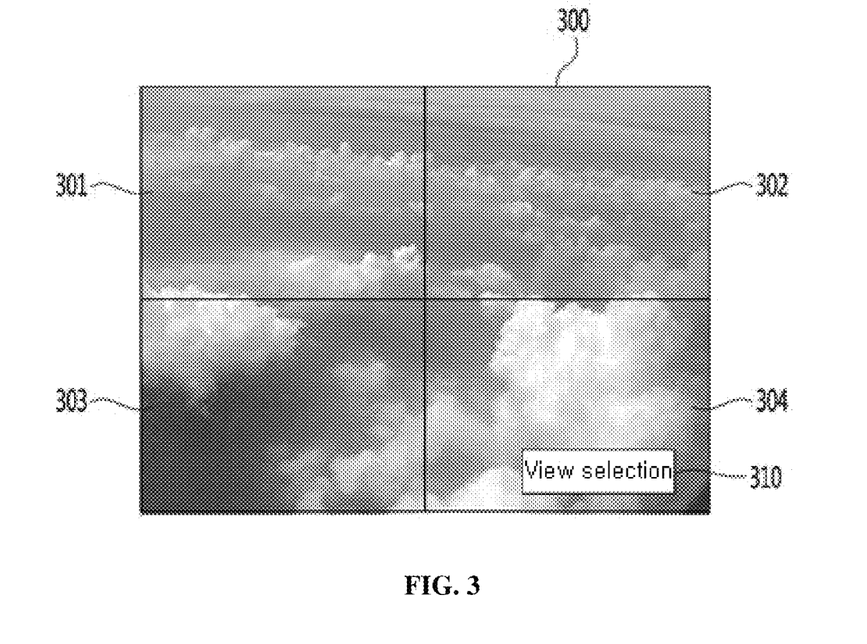
FIG. 3 is a drawing which shows a screen in which an aircraft external panoramic view image is provided on the multi-display of FIG. 1 according to an embodiment of the present disclosure.

FIG. 3 is a drawing which shows a screen in which an aircraft external panoramic view image is provided on the multi-display of FIG. 1 according to an embodiment of the present disclosure. The multi-display 300 is shown as an example of the multi-display 134 of FIG. 1. According to an embodiment of the present disclosure, the multi-display 300 can be installed in spaces at various positions available of aircraft cabin walls such as the space between the windows and the ceiling inside the aircraft cabin. The multi-display 300 of FIG. 3 includes four of the sub-displays 301, 302, 303, 304, wherein the sub-displays 301, 302, 303, 304 have a 2×2 matrix array. However, the number and the type of the array of the sub-displays included in the multi-display 134 are not limited thereto. For example, depending on the dimension and type of the space the multi-display 134 can be installed in, the sub-displays can be installed in various array types such as 1×3, 1×5 and 2×3.

When outputting aircraft external panoramic view images to the multi-display 134 the control unit 120 can collect images from the cameras internally determined, produce panoramic views from the collected images and output them. The control unit 120 can provide the one sub-display 304 among a plurality of the sub-displays 301, 302, 303, 304 selectively with the view selection menu icon 310.

Figure 4:
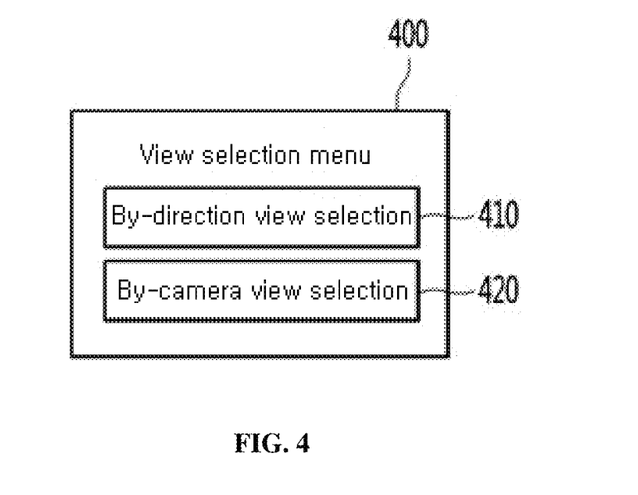
FIG. 4 is a drawing which describes an example of the view selection menu according to an embodiment of the present disclosure.

FIG. 4 is a drawing which describes an example of the view selection menu according to an embodiment of the present disclosure. The view selection menu 400 can include the by-direction view selection menu 410 and the by-camera view selection menu 420. The by-direction view selection menu 410 is a menu provided for selecting by-direction views according to the direction in which the cameras are installed. The by-camera view selection menu 420 is a menu provided for selecting images taken by each of the cameras installed.

Figure 5:
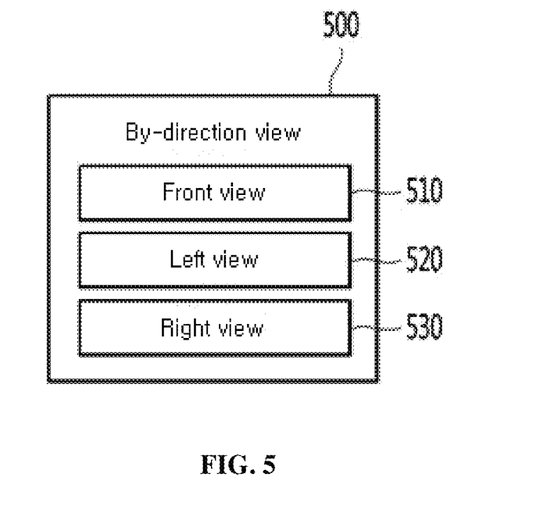
FIG. 5 is a drawing which describes an example of a by-direction view selection menu of FIG. 4.

FIG. 5 is a drawing which describes an example of the by-direction view selection menu of FIG. 4. Selecting the by-direction view selection menu 410 (corresponding to reference character 500 in FIG. 5) of FIG. 4 can provide a front view menu 510, a left view menu 520 and a right view menu 530 of the aircraft. When the front view menu 510 is selected by a user the control unit 120 can control the display unit 130 so that aircraft front views are provided to the display unit 130. When the left view menu 520 is selected by a user the control unit 120 can control the display unit 130 so that aircraft left views are provided to the display unit 130. When the right view menu 530 is selected by a user the control unit 120 can control the display unit 130 so that aircraft right views are provided to the display unit 130.

According to an embodiment of the present disclosure, selecting the by-direction view selection menu 410 can also enable the control unit 120 to provide by-direction views, as classified into aircraft front-left camera views, aircraft front-right camera views, aircraft rear-left camera views and aircraft rear-right camera views, depending on the direction the cameras are installed in.

Figure 6:
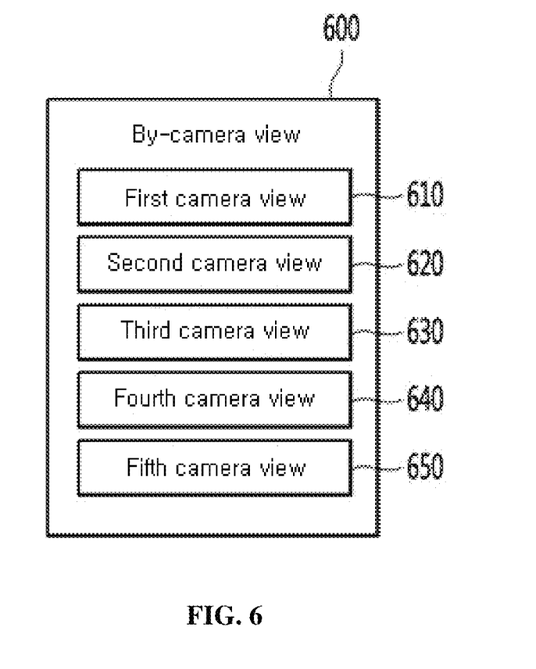
FIG. 6 is a drawing which describes an example of a by-camera view selection menu of FIG. 4.

FIG. 6 is a drawing which describes an example of the by-camera view selection menu of FIG. 4. Selecting the by-camera view selection menu 420 (corresponding to reference character 600 in FIG. 6) of FIG. 4 can select by-camera views including a first camera view 610, a second camera view 620, a third camera view 630, a fourth camera view 640 and a fifth camera view 650. Although FIG. 6 illustrates the menu providing five types of camera views for convenience, such camera views can be provided as many as the number of the cameras installed in the aircraft. In addition, the by-camera view selection menu 600 is provided in the shape of an aircraft model so that the control unit 120 indicates, and provides, the location of each of a plurality of the cameras in the aircraft model on the display unit 130, wherein selecting a predetermined camera location with the user input unit 150 among the locations of the cameras can provide images taken by the camera selected according to the control of the control unit 120 on the display unit 130.

Figure 7:
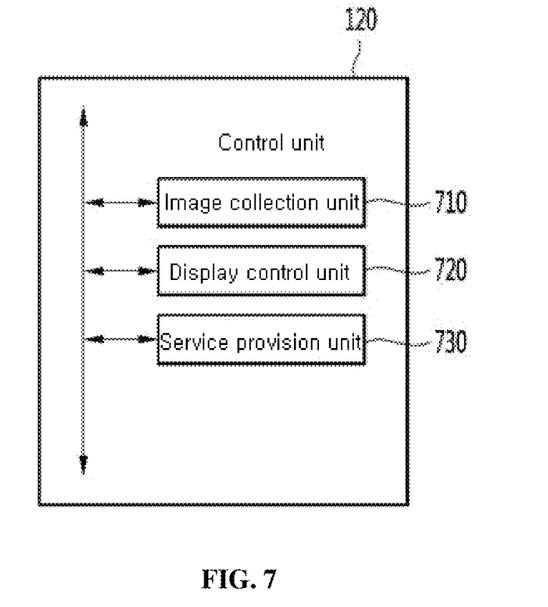
FIG. 7 is a block diagram which describes an example of a configuration of the control unit of FIG. 1.

FIG. 7 is a block diagram which describes an example of a configuration of the control unit of FIG. 1. With reference to FIGS. 1 and 7, the control unit 120 can include an image collection unit 710, a display control unit 720 and a service provision unit 730. The image collection unit 710, the display control unit 720 and the service provision unit 730 can be configured so that they communicate with each other to transmit and receive data.

The image collection unit 710 collects images input from each of the cameras 112, 114, 116 included in the shooting unit 110. Each image is collected along with camera identification information for identifying each of the cameras 112, 114, 116 so as to identify which of the cameras has taken the image. Furthermore, when images from each of the cameras 112, 114, 116 are received, the image collection unit 710 adds shooting time information of each of the images to their image frame so that it can manage the taken images together with the shooting time information.

The display control unit 720 controls the displays so that images collected by the image collection unit 710 conform to the characteristics of each of the displays of the display unit 130. For this purpose, the display control unit 720 can manage display identification information and display characteristic information of the single display 132 and the multi-display 134 included in the display unit 130. The display characteristic information can include display type information to identify whether one corresponds to the single display 132 or the multi-display 134, display installation location information and, when it comes to the multi-display, multi-display array information. Here, the display installation location information can include display installation angle information and adjacent display identification information. The display characteristic information can be collected by means of a plurality of the display sensors which are installed in each of the displays 132, 134 included in the display unit 130 for detecting installation types of each of the displays 132, 134 and the communication modules, e.g. NFC and Wi-Fi, for detecting the adjacent display and the like.

The service provision unit 730 executes a plurality of applications performing various applications services which can be provided through the display unit 130. Here, the applications can include an entertainment application which can be linked to the view selection menu 400 of a user. The service provision unit 730 can collect through the view selection menu 400 the identification information of a display which is outputting the images taken by the cameras then determine the display which is outputting the images taken by the cameras among a plurality of the displays included in the display unit 130 by using the collected display identification information through the view selection menu 400. In addition, the service provision unit 730 can integrate entertainment applications which can be linked to the view selection menu 400 of a user with existing entertainment systems for enabling various types of in-flight multimedia to be achieved, thereby enabling passengers to use various application services including external panoramic views along with existing entertainment systems.

Figure 8:
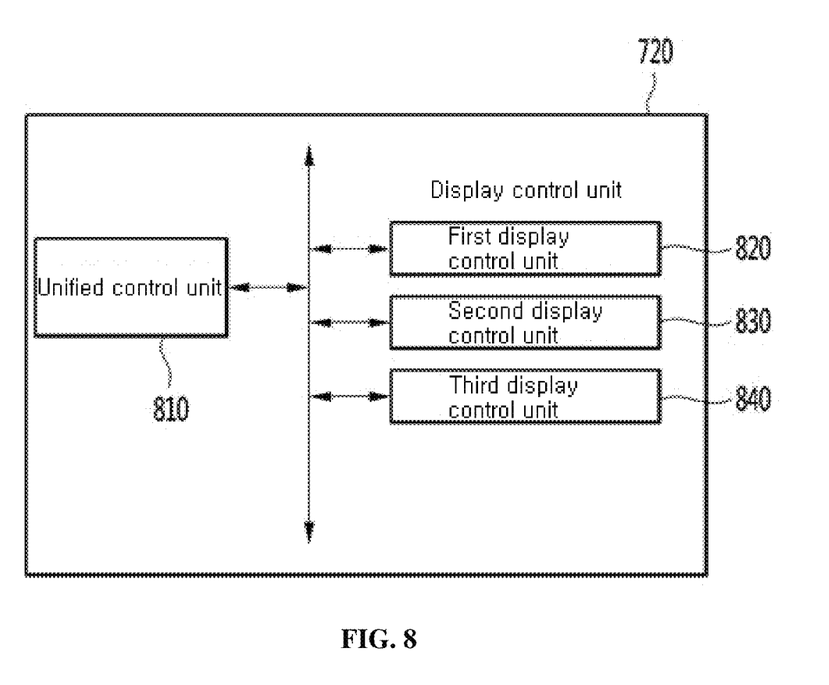
FIG. 8 is a block diagram which describes an example of a configuration of a display control unit of FIG. 7.

FIG. 8 is a block diagram which describes an example of a configuration of the display control unit of FIG. 7. The display control unit 720 can include a unified control unit 810, a first display control unit 820, a second display control unit 830 and a third display control unit 840. Here is illustrated three of the display control units for convenience but the number of the display control units corresponds to the number of the entire displays installed in the aircraft. The unified control unit 810 controls the first display control unit 820, the second display control unit 830 and the third display control unit 840 so that images collected by the image collection unit 710 conform to the characteristics of each of the displays of the display unit 130. When the display connected to the first display control unit 820 is the single display 132, the first display control unit 820 can provide views, e. g. by-direction views and by-camera views, selected by a user on a single full screen.

When the display connected to the second display control unit 830 is the multi-display 134, the control unit 120 can manage camera identification information and installation location information of a plurality of the camera, perform a process for composing a plurality of images based on the installation location information so as to provide the images acquired by the cameras in the form of panoramic views and divide and distribute the composed and produced panoramic views to a plurality of the sub-displays. For example, when the multi-display 134 has four of the sub-displays 301, 302, 303, 304 in a 2×2 array as shown in FIG. 3, such panoramic view images can be divided and distributed in a 2×2 array to the four of the sub-displays 301, 302, 303, 304.

Figure 9:
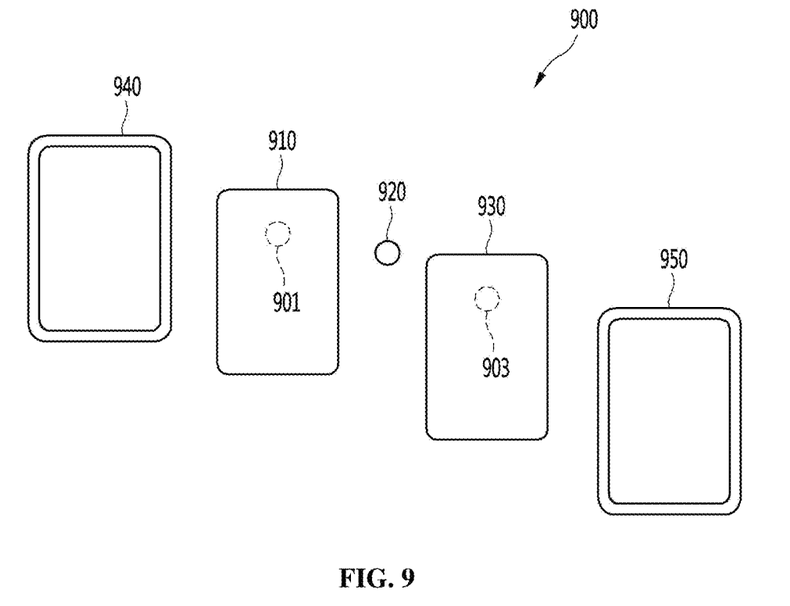
FIG. 9 is a drawing which illustrates the cameras inserted in aircraft windows according to an embodiment of the present disclosure.

FIG. 9 is a drawing which illustrates the cameras inserted in aircraft windows according to an embodiment of the present disclosure. The window 900 the camera 920 is inserted in can include a first support 940, a first layer 910, the camera 920, a second layer 930 and a second support 950.

The first layer 910 and the second layer 930 have a predetermined thickness and they can be configured so that the camera 920 is inserted between a first groove 901 of the first layer 910 and a second groove 903 of the second layer 930. The first groove 901 of the first layer 910 and the second groove 903 of the second layer 930 can vary in terms of their thickness and depth depending on the outer shape of the camera 920.

The first support 940 and the second support 950 can be designed to support the first layer 910 and the second layer 930, respectively. The rim of the first layer 910 and the second layer 930 can be tightly sealed by being filled in with silicone between the first support 940 and the second support 950 so as to prevent foreign substance intrusion between the first layer 910 and the second layer 930. The first support 940 and the second support 950 can be fastened by using fastening devices such as bolts but not limited thereto.

Although it is shown in FIG. 9 that the window 900 has a double-layered, or double pane window structure, the window 900 can have a triple- or quadruple-layered configuration, wherein the camera 920 can be installed by being inserted in a predetermined middle layer among a plurality of the layers of the window 900.

Figure 10:
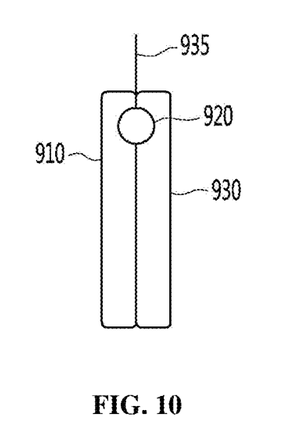
FIG. 10 is a drawing which illustrates a flank of the camera inserted in an aircraft window of FIG. 9.

FIG. 10 is a drawing which illustrates a flank of the camera inserted in an aircraft window of FIG. 9. The camera 920 is inserted between the first layer 910 and the second layer 930, and an optical fiber 935 is connected to the camera 920 to connect to the control unit 120 of FIG. 1 so that images taken by the camera 920 can be transferred to the control unit 120.

Figure 11:
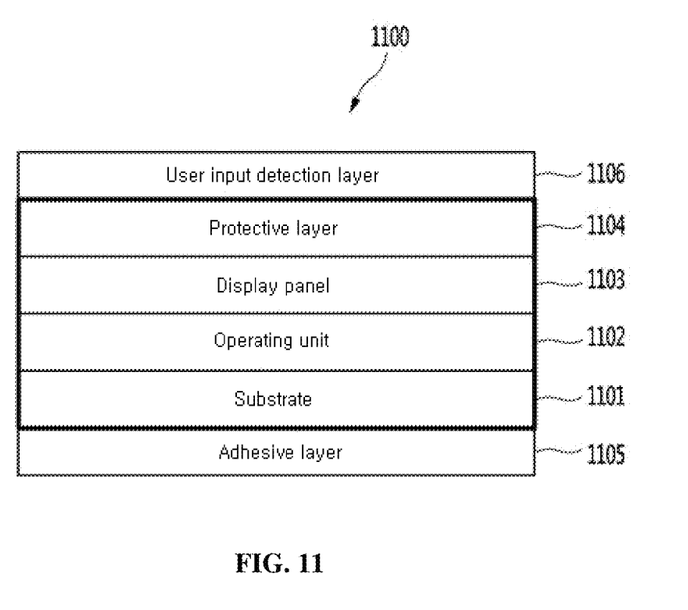
FIG. 11 is a drawing which describes a configuration of the flexible display according to an embodiment of the present disclosure.

FIG. 11 is a drawing which describes a configuration of the flexible display according to an embodiment of the present disclosure. The single display 132 or the multi-display 134 of the display unit 130 of FIG. 1 can have the flexible display 1100 having a structure as illustrated in FIG. 11. The flexible display 1100 includes a substrate 1101, an operating unit 1102, a display panel 1103 and a protective layer 1104. Furthermore, the flexible display 1100 according to an embodiment of the present disclosure can further include the adhesive layer 1105 so that it can easily adhere to a predetermined space in an aircraft.

The flexible display 1100 refers to a device which keeps the displaying properties of existing flat panel display devices intact and can be bent, folded or rolled like paper. The substrate 1101 can be materialized by using a plastic substrate, e. g. macromolecular films, which can be transformed under external pressure. Meanwhile, the substrate 1101 can also be made of, besides plastic substrates, materials having flexibility such as thin glass and metal foil.

The operating unit 1102 operates the display panel 1103. More specifically, the operating unit 1102 applies drive voltage on a plurality of pixels which constitute the display panel 1103 and can be made of a-si TFTs, LTPS (low temperature polysilicon) TFTs, OTFT (organic TFT)s and the like. Apart from OLEDs, the display panel 1103 can also be made of ELs, EPD (electrophoretic display)s, ECD (electrochromic display)s, LCD (liquid crystal display)s, AMLCDs, PDP (plasma display panel)s and the like. However, LCDs require separate backlights in that they cannot emit light by themselves. LCDs without backlights use ambient light. The protective layer 1104 protects the display panel 1103. The protective layer 1104 is manufactured into the form of a transparent film to cover the display panel 1103 entirely.

Meanwhile, as illustrated in FIG. 11, the flexible display 1100 can be materialized into electronic paper. Electronic paper is a display for which the properties of conventional inks are applied onto paper and differs from ordinary flat displays in that it uses reflected light. Twist balls or electrophoresis using capsules are used to change pictures or letters on electronic paper. The flexible display 1100 can further include the user input detection layer 1106 for detecting user input onto the flexible display 1100. The user input detection layer 1106 can be installed between the top surface of the protective layer 1104 or the protective layer 1104 and the display panel 1103, but not limited thereto, while the user input detection layer 1106 can have a plurality of layers depending on the type and number of sensors to be included therein.

Figure 12:
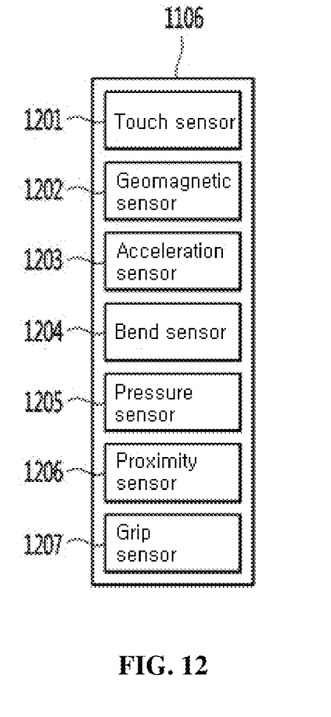
FIG. 12 is a drawing which describes a plurality of the display sensors that can be included in a user input detection layer of FIG. 11.

FIG. 12 is a drawing which describes a plurality of the display sensors that can be included in the user input detection layer of FIG. 11. The user input detection layer 1106 can have various types of sensors including a touch sensor 1201, a geomagnetic sensor 1202, an acceleration sensor 1203, a bend sensor 1204, a pressure sensor 1205, a proximity sensor 1206 and a grip sensor 1207.

The touch sensor 1201 can be achieved into either capacitive or resistive ones. A capacitive touch sensor uses a dielectric material coated on the flexible display 1100 to calculate touch coordinates by detecting microcurrent electricity excited to the user body when part of the user body touches the surface of the flexible display 1100. A resistive touch sensor has two electrode plates to calculate touch coordinates by detecting a current that flows when the upper plate and the lower plate contact with each other at the touched point when a user touches its screen.

The geomagnetic sensor 1202 is to detect the rotation state, displacement direction and the like of the flexible display 1100 and the acceleration sensor 1203 is to detect the degree to which the flexible display 1100 inclines. Both the geomagnetic sensor 1202 and the acceleration sensor 1203 can be employed to detect bending properties such as bending directions and bended areas of the flexible display 1100 and, apart from it, further used to detect the state of rotation, inclination and the like of the flexible display 1100. The bend sensor 1204 can be materialized into various types and numbers to detect the bending state of the flexible display 1100.

The pressure sensor 1205 is to detect the size of the pressure imposed on the flexible display 1100 when a user touches or bends it and transfers the value to the control unit 120. The pressure sensor 1205 can include a piezo film which is embedded in the display unit 130 and outputs electrical signals in response to the size of the pressure. It is illustrated in FIG. 12 the pressure sensor 1205 is separated from the touch sensor 1201. When the touch sensor 1201 is made of a resistive touch sensor, however, the resistive touch sensor can function as the pressure sensor 1205 as well.

The proximity sensor 1206 is to detect approaching motion without contact to display surfaces. The proximity sensor 1206 can be achieved into various types of sensors such as high-frequency oscillation types which generate a high-frequency magnetic field to detect an electric current induced by magnetic field properties that vary when an object approaches, magnetic types which use a magnet and capacitive types which detect capacities that vary when an object approaches. Separate from the pressure sensor 1205, the grip sensor 1207 is placed around the rim or grip of the flexible display 1100 to detect user grips. The grip sensor 1207 can be materialized into the pressure sensor or the touch sensor.

Various signals detected by the user input detection layer 1106 are transferred to the control unit 120 while the control unit 120 can provide various aircraft external panoramic views or diverse application playing screens through the display unit 130 according to the detection signals following user inputs.

Figure 13:
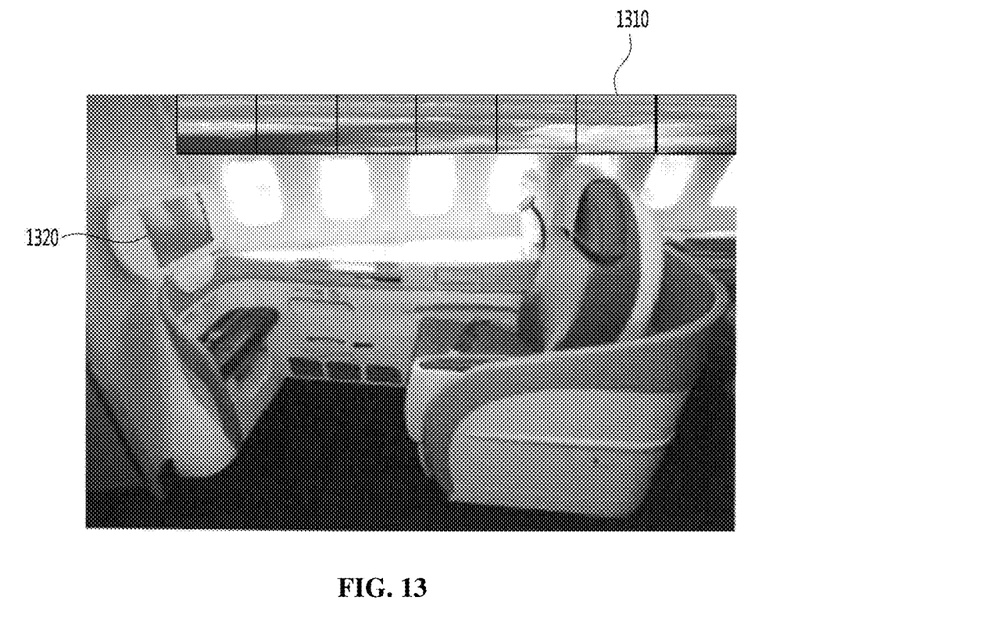
FIG. 13 is a drawing which shows that aircraft external panoramic view images are provided in an aircraft first class through the single display and the multi-display as an embodiment of the present disclosure.
Figure 14:
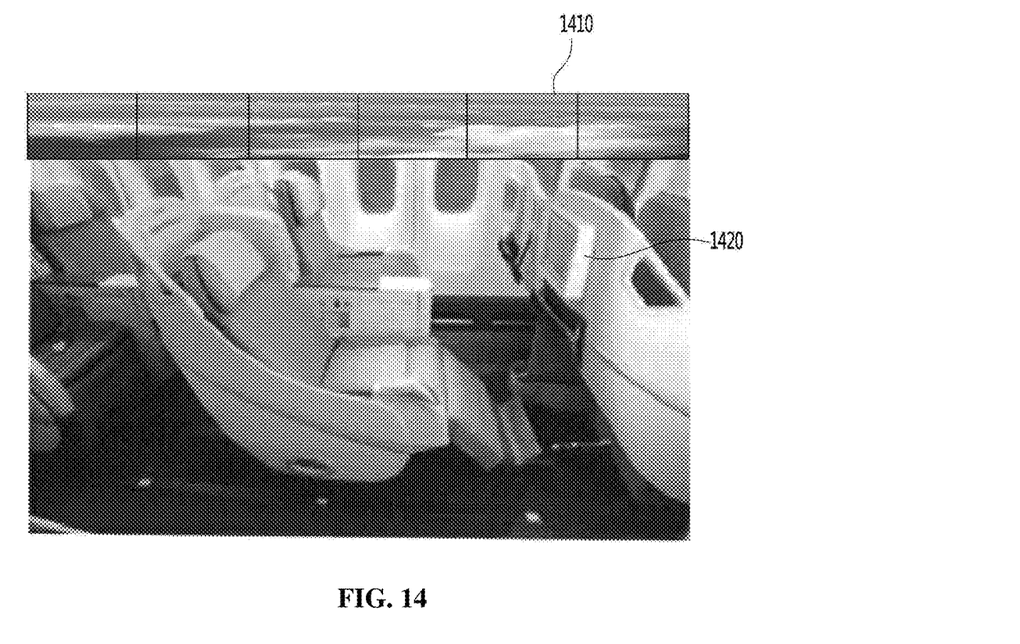
FIG. 14 is a drawing which shows that aircraft external panoramic view images are provided in an aircraft business class through the single display and the multi-display as an embodiment of the present disclosure.
Figure 15:
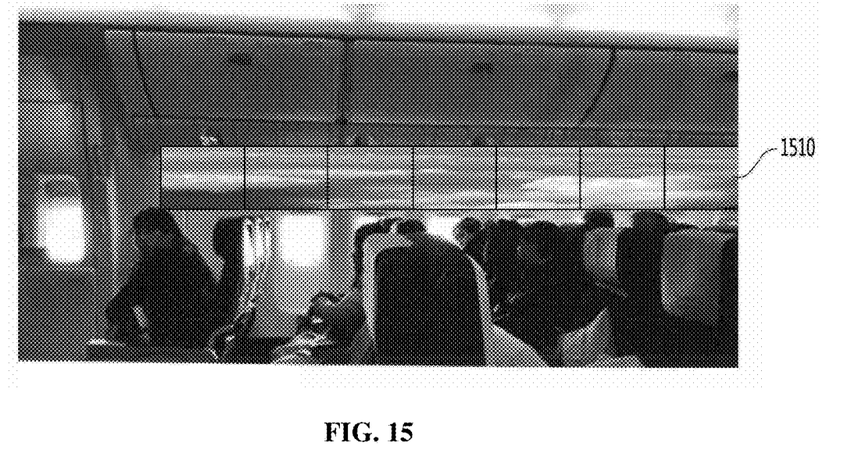
FIG. 15 is a drawing which shows that aircraft external panoramic view images are provided in an aircraft economy class through the multi-display as an embodiment of the present disclosure.

FIG. 13 is a drawing which shows that aircraft external panoramic view images are provided in an aircraft first class through the single display and the multi-display as an embodiment of the present disclosure; FIG. 14 is a drawing which shows that aircraft external panoramic view images are provided in an aircraft business class through the single display and the multi-display as an embodiment of the present disclosure; and FIG. 15 is a drawing which shows that aircraft external panoramic view images are provided in an aircraft economy class through the multi-display as an embodiment of the present disclosure.

With reference to FIGS. 1, 13 and 14, the control unit 120 processes images taken by a plurality of the cameras 112, 114, 116 according to the first image output request signals, as received from the display unit 130, from the single display 132 such as the single displays 1320, 1420 as in FIGS. 13 and 14 and the second image output request signals from the multi-display 134 such as the multi-displays 1310, 1410 as in FIGS. 13 and 14 and transfers the processed images to the display unit 130. When the second image output request signals are received the control unit 120 performs control so that it produces panoramic views by using images taken by the cameras 112, 114, 116 and outputs the produced panoramic view images to the multi-display 1310, 1410 based on array composition information of the multi-display 1310, 1410.

The array composition information of the multi-display 1310, 1410 can include the number and the array shape information of a plurality of the sub-displays included in the multi-display 1310, 1410. The control unit 120 can process images taken according to the array composition information of the multi-display 1310, 1410 and distribute them to a plurality of the sub-displays included in the multi-display 1310, 1410. It is shown seven of the sub-displays are arrayed in a single line, or 7×1 array in FIG. 13 and that six of the sub-displays are arrayed in a single line, or 6×1 array FIG. 14. However, the number and array shapes of the sub-displays are not limited thereto.

In an embodiment, as in FIGS. 13 and 14, the multi-display 1310, 1410 is installed in the space between the windows and the ceiling inside an aircraft cabin, wherein the control unit 120 can provide images, in the form of panoramic views, taken by a plurality of the cameras installed in a plurality of the windows adjacent to the space by means of the multi-display 1310, 1410 installed in the space between the windows and the ceiling inside the aircraft cabin. To be specific, it can be configured that a plurality of predetermined camera images are provided as panoramic views through the multi-display 1310, 1410 even without separate user input signals.

To this end, the control unit 120 of FIG. 1 can control the camera identification information of the cameras 112, 114, 116 together with their installation location information. The installation location information can include installation location information and installation angle information of the aircraft windows in which the cameras 112, 114, 116 are installed. The control unit 120 can perform a process for composing a plurality of the images based on the installation location information so as to provide the images acquired by the cameras in the form of panoramic views. For this purpose, the control unit 120 can coordinate installation locations of the windows inside an aircraft, thereby managing them as aircraft window installation location information.

The single display 1320, 1420 is installed in aircraft passenger seats while the control unit 120 can provide to the single display 1320, 1420 the images selected depending on user input signals among a plurality of images taken by a plurality of the cameras.

With reference to FIGS. 1 and 15, the control unit 120 processes images taken by a plurality of the cameras 112, 114, 116 according to the second image output request signals, as received from the display unit 130, from the multi-display 134 such as the multi-displays 1510 as in FIG. 15 and transfers the processed images to the display unit 130. When the second image output request signals are received the control unit 120 performs control so that it produces panoramic views by using images taken by the cameras 112, 114, 116 and outputs the produced panoramic view images to the multi-display 1310, 1410 based on array composition information of the multi-display 1310, 1410

The array composition information of the multi-display 1510 can include the number and the array shape information of a plurality of the sub-displays included in the multi-display 1510. The control unit 120 can process images taken according to the array composition information of the multi-display 1510 and distribute them to a plurality of the sub-displays included in the multi-display 1510. It is shown seven of the sub-displays are arrayed in a single line, or 7×1 array in FIG. 15. However, the number and array shapes of the sub-displays are not limited thereto.

In an embodiment, as in FIG. 15, the multi-display 1510 is installed in the space between the windows and the ceiling inside an aircraft cabin, wherein the control unit 120 can provide images, in the form of panoramic views, taken by a plurality of the cameras installed in a plurality of the windows adjacent to the space by means of the multi-display 1510 installed in the space between the windows and the ceiling inside the aircraft cabin. To be specific, it can be configured that a plurality of predetermined camera images are provided as panoramic views through the multi-display 1510 even without separate user input signals.

To this end, the control unit 120 of FIG. 1 can manage the camera identification information of the cameras 112, 114, 116 together with their installation location information. The installation location information can include installation location information and installation angle information of the aircraft windows in which the cameras 112, 114, 116 are installed. The control unit 120 can perform a process for composing a plurality of the images based on the installation location information so as to provide the images acquired by the cameras in the form of panoramic views. For this purpose, the control unit 120 can coordinate installation locations of the windows inside an aircraft, thereby managing them as aircraft window installation location information.

According to an embodiment of FIG. 15, the single display, not shown, like in FIGS. 13 and 14 can be further installed in the form of the flat panel display or the flexible display in aircraft passenger seats, wherein the control unit 120 can provide the images selected according to user input signals among images taken by the cameras to the single display.

An aspect of the present disclosure can be achieved in a recording medium a computer can read as code a computer can read. The code and its segments for achieving the program can be easily deduced by computer programmers in the art. The recording medium computers can read includes all types of recording media which can be read by computer systems and in which data are stored. Examples of the recording medium computers can read include ROMs, RAMs, CD-ROMs, magnetic tapes, floppy disks, optical disks and the like. Furthermore, the recording medium computers can read can be distributed to computer systems connected over networks and stored and executed by code computers can read in a distributed fashion.

REFERENCE CHARACTERS

100: Apparatus for providing external panoramic view contents for an aircraft during flight
110: Shooting unit
112, 114, 116: First, second and third camera
120: Control unit
130: Display unit
132: Single display
134: Multi-display
140: Detection unit
142, 144, 146: First, second and third sensor
150: User input unit
160: Storage unit
200: Single display
210, 310: View selection menu icon
300: Multi-display
301, 302, 303, 304: Sub-display
400: View selection menu
410, 500: By-direction view selection menu
420: By-camera view selection menu
510: Front view menu
520: Left view menu
530: Right view menu
600: By-camera view selection menu
610, 620, 630, 640, 650: First, second, third, fourth and fifth camera view
710: Image collection unit
720: Display control unit
730: Service provision unit
810: Unified control unit
820, 830, 840: First, second and third display control unit
900: Aircraft window
901, 903: First and second groove
910, 930: First and second layer
920: Camera
935: Optical fiber
940, 950: First and second support
1100: Flexible display
1101: Substrate
1102: Operating unit
1103: Display panel
1104: Protective layer
1105: Adhesive layer
1106: User input detection layer
1201: Touch sensor
1202: Geomagnetic sensor
1203: Acceleration sensor
1204: Bend sensor
1205: Pressure sensor
1206: Proximity sensor
1207: Grip sensor
1310, 1410, 1510: Multi-display
1320, 1420: Single display

What is claimed is:

1. An apparatus for providing external panoramic view contents for an aircraft during flight, including: a shooting unit (110); a display unit (130); and a control unit (120);
wherein the shooting unit (110) includes a plurality of cameras (112, 114, 116) each of which is installed in each of a plurality of windows installed in an aircraft for shooting its external panoramic views;
the display unit (130) includes a single display (132) and a multi-display (134) which includes a plurality of sub-displays, wherein the multi-display (134), having a flexible display, is installed in the space between the windows and the ceiling inside an aircraft cabin;
wherein the control unit (120), being connected to the shooting unit (110) and the display unit (130), controls the shooting unit (110) and the display unit (130), receives a plurality of images taken by the cameras (112, 114, 116), thereby, through the multi-display (134) installed in the space between the windows and the ceiling inside the aircraft cabin, and provides the images being taken by the cameras installed in a plurality of the windows adjacent to the corresponding space in the form of a panoramic view;
wherein the plurality of the cameras (112, 114, 116) are installed on a predetermined middle layer among a plurality of layers of aircraft windows and connected to the control unit (120) by means of optical fiber cables; wherein the cameras (112, 114, 116) are installed at angles different from each other when being installed in aircraft windows so that shooting angles of the taken images vary, and at least one of the cameras (112, 114, 116) is installed in the front windows of the aircraft cockpit;
wherein the control unit (120) controls camera identification information for identifying each of the cameras (112, 114, 116) and performs a process for composing a plurality of images based on installation location information so as to provide the images acquired by the cameras in the form of panoramic views, wherein the installation location information includes installation location and installation angle information, according to which the cameras (112, 114, 116) are installed in the aircraft windows;
wherein the control unit (120) manages camera identification and installation location information, including installation location and installation angle information, that identifies each of the cameras (112, 114, 116), thereby the images taken from the cameras (112, 114, 116) are controlled separately using camera identification information identifying the cameras (112, 114, 116) and, when the images are received separately from the cameras (112, 114, 116), a shooting time that each image is taken is added to an image frame to manage the images taken with a time information of the shooting time, and to provide the panoramic view, the process of synthesizing multiple images from the cameras (112, 114, 116) based on the installation location information is carried out;
wherein the control unit (120) manages display identification information and display characteristics information of the single display (132) and the multi-display (134) included in the display unit (130);

wherein the display characteristics information comprises display type information to identify whether the display corresponds to the single display or the multi-display, display installation location information, and multi-display array information when the display is a multi-display; wherein the display installation location information includes display installation angle information and adjacent display identification information;

wherein the display unit (130) further includes a communication module which recognizes a plurality of display sensors which are installed in a plurality of displays for detecting the installation form of each of the displays and the adjacent displays, and communicates with the control unit (120);

wherein the control unit (120) collects the display installation location information through communication with the communication module of the display unit (130);

wherein the plurality of displays included in the display unit (130) are configured to send and receive the display identification information for each display through the adjacent displays and communication modules, communicate using identification information for each display sent and received, and send and receive display installation location information for each display; and each display included in the display unit (130) collects identification information and the display installation location information for other adjacent displays, and sends collected identification information and the display installation location information of the other adjacent displays to another display or to the control unit (120);

a plurality of display sensors provides various sensing signals to the control unit (120), which provides various external view images or application run screens depending on the sensing signals through the display unit (130);

wherein the plurality of display sensors include a touch sensor (1201), geomagnetic sensor (1202), which detects a rotational state and direction of movement of flexible displays, acceleration sensor (1203), which detects a tilting degree of the flexible display, bend sensor (1204) that detects bending conditions of flexible displays, a pressure sensor (1205) that detects the amount of pressure exerted during touch or bending operations, a proximity sensor (1206) that detects motion approaching without touching the surface of the flexible display, and a grip sensor (1207) that is positioned on a rim or handle of the flexible display separately from the pressure sensor (1205) to detect a grip of a user; and wherein the control unit transfers to the display unit (130) at least one of the images taken by the cameras (112, 114, 116) according to a first image output request signal from the single display (132) and a second image output request signal from the multi-display (134), and when the second image output request signal is received, produces panoramic views by using the images taken by the cameras (112, 114, 116), thereby outputting the produced panoramic view images to the multi-display (134) based on the array composition information of the multi-display (134).

2. The apparatus for providing external panoramic view contents for an aircraft during flight of claim 1, wherein the array composition information of the multi-display (134) includes a number and array shape information of the plurality of the sub-displays as included in the multi-display (134) while the control unit (120) processes the images taken according to the array composition information of the multi-display (134), thereby distributing them to a plurality of the sub-displays included in the multi-display (134).

3. The apparatus for providing external panoramic view contents for an aircraft during flight of claim 1, wherein the control unit (120) provides a view selection menu when outputting images to the single display (132) and the multi-display (134), wherein the view selection menu includes a by-direction view selection mode for selecting by-direction views depending on the direction in which the cameras are installed in the aircraft and a by-camera view selection mode for selecting by-camera views; and the control unit (120) executes applications for entertainment that can be linked to the view selection menu.

4. The apparatus for providing external panoramic view contents for an aircraft during flight of claim 3, wherein the by-direction views depending on the direction in which the cameras are installed includes an aircraft front-left camera view, an aircraft front-right camera view, an aircraft rear-left camera view and an aircraft rear-right camera view.

* * * * *